United States Patent
Reid, II et al.

(10) Patent No.: US 7,178,556 B2
(45) Date of Patent: Feb. 20, 2007

(54) MODULAR COMPONENT CONNECTOR SUBSTRATE ASSEMBLY SYSTEM

(75) Inventors: Kenneth Edward Reid, II, Oxford, AL (US); Frank Anthony Ruiz, Greenwell Springs, LA (US); Claire Wang, Madison, AL (US)

(73) Assignee: Parker-Hannifin Corporation, Cleveland, OH (US)

( * ) Notice: Subject to any disclaimer, the term of this patent is extended or adjusted under 35 U.S.C. 154(b) by 192 days.

(21) Appl. No.: 10/912,212

(22) Filed: Aug. 4, 2004

(65) Prior Publication Data

US 2005/0028878 A1    Feb. 10, 2005

Related U.S. Application Data

(60) Provisional application No. 60/493,161, filed on Aug. 7, 2003.

(51) Int. Cl.
*F16K 11/10* (2006.01)
(52) U.S. Cl. ............... 137/884; 137/271; 285/124.5
(58) Field of Classification Search ............ 137/269, 137/270, 271, 557, 884; 285/124.5, 125.1
See application file for complete search history.

(56) References Cited

U.S. PATENT DOCUMENTS

| | | | |
|---|---|---|---|
| 3,589,387 A | 6/1971 | Raymond | |
| 3,654,960 A | 4/1972 | Kiernan | |
| 3,806,088 A * | 4/1974 | Stoneman et al. | 251/367 |
| 3,885,389 A | 5/1975 | Hull | |
| 3,915,194 A | 10/1975 | Friedrich | |
| 4,082,324 A | 4/1978 | Obrecht | |
| 4,095,864 A | 6/1978 | Hardin | |
| 4,102,526 A | 7/1978 | Hargraves | |
| 4,388,050 A * | 6/1983 | Schuller | 417/454 |
| 4,524,807 A | 6/1985 | Toliusis | |
| 4,699,402 A * | 10/1987 | Stoll et al. | 285/26 |
| 4,770,210 A | 9/1988 | Neff et al. | |
| 4,782,852 A * | 11/1988 | Legris | 137/269 |
| 4,848,393 A | 7/1989 | West | |
| 4,896,700 A | 1/1990 | Stoll | |
| 4,932,429 A | 6/1990 | Watanabe et al. | |
| 4,967,781 A | 11/1990 | Baron | |
| 5,050,631 A * | 9/1991 | Konno et al. | 137/270 |
| 5,178,191 A * | 1/1993 | Schaefer | 137/884 |
| 5,459,953 A | 10/1995 | Fukano et al. | |

(Continued)

FOREIGN PATENT DOCUMENTS

DE    25 47 847    5/1977

(Continued)

*Primary Examiner*—John Fox
(74) *Attorney, Agent, or Firm*—Christopher H. Hunter

(57) ABSTRACT

A modular component connector substrate assembly for mounting thereon of at least one fluid control component, the assembly including at least two substrate blocks or one substrate block and an end block, all in fluid communication with each other via internal passages, with a separate fluid pressure connector fluidically interconnecting and fixedly spacing adjacent ones the substrate blocks and/or end blocks with adjacent substrate blocks, wherein the conduits connected by the pressure connector all being located in a common internal plane and thus being capable of extending in any of the compass directions (N,S,E,W) within this common plane. The bottom surfaces of the substrate and end plates abut mounting plates configured to the existing ANSI/ISA SP76 specification.

40 Claims, 7 Drawing Sheets

U.S. PATENT DOCUMENTS

| | | | |
|---|---|---|---|
| 5,503,185 A | 4/1996 | Krause | |
| 5,529,088 A * | 6/1996 | Asou | 137/343 |
| 5,790,914 A | 8/1998 | Gates et al. | |
| 5,836,355 A | 11/1998 | Markulec et al. | |
| 5,967,188 A | 10/1999 | Chien-Chuan | |
| 5,988,217 A * | 11/1999 | Ohmi et al. | 137/614.2 |
| 5,992,463 A | 11/1999 | Redemann et al. | |
| 6,109,298 A | 8/2000 | Kaneko et al. | |
| 6,116,283 A * | 9/2000 | Yamaji et al. | 137/884 |
| 6,142,539 A | 11/2000 | Redemann et al. | |
| 6,158,454 A | 12/2000 | Duret et al. | |
| 6,186,161 B1 | 2/2001 | Hiramatsu | |
| 6,189,570 B1 | 2/2001 | Redemann et al. | |
| 6,192,938 B1 | 2/2001 | Redemann et al. | |
| 6,283,155 B1 | 9/2001 | Vu | |
| 6,293,310 B1 | 9/2001 | Redemann et al. | |
| 6,302,141 B1 | 10/2001 | Markulec et al. | |
| 6,374,859 B1 | 4/2002 | Vu et al. | |
| 6,382,238 B2 * | 5/2002 | Ishii et al. | 137/271 |
| 6,394,138 B1 | 5/2002 | Vu et al. | |
| 6,415,822 B1 * | 7/2002 | Hollingshead | 137/884 |
| 6,435,215 B1 | 8/2002 | Redemann et al. | |
| 6,474,700 B2 | 11/2002 | Redemann et al. | |
| 6,523,570 B2 | 2/2003 | Weiss et al. | |
| 6,776,193 B2 | 8/2004 | Eidsmore | |
| 2004/0129324 A1 | 7/2004 | Vu | |

FOREIGN PATENT DOCUMENTS

| | | |
|---|---|---|
| EP | 0 360 873 | 4/1990 |
| EP | 0 626 521 | 11/1994 |
| EP | 1 291 636 A2 | 9/2002 |
| FR | 2 250 907 | 6/1975 |
| FR | 73 40790 | 6/1975 |
| GB | 1 533 202 | 11/1978 |
| WO | 95/10001 | 4/1995 |
| WO | 96/29529 | 9/1996 |
| WO | 98/25058 | 6/1998 |

\* cited by examiner

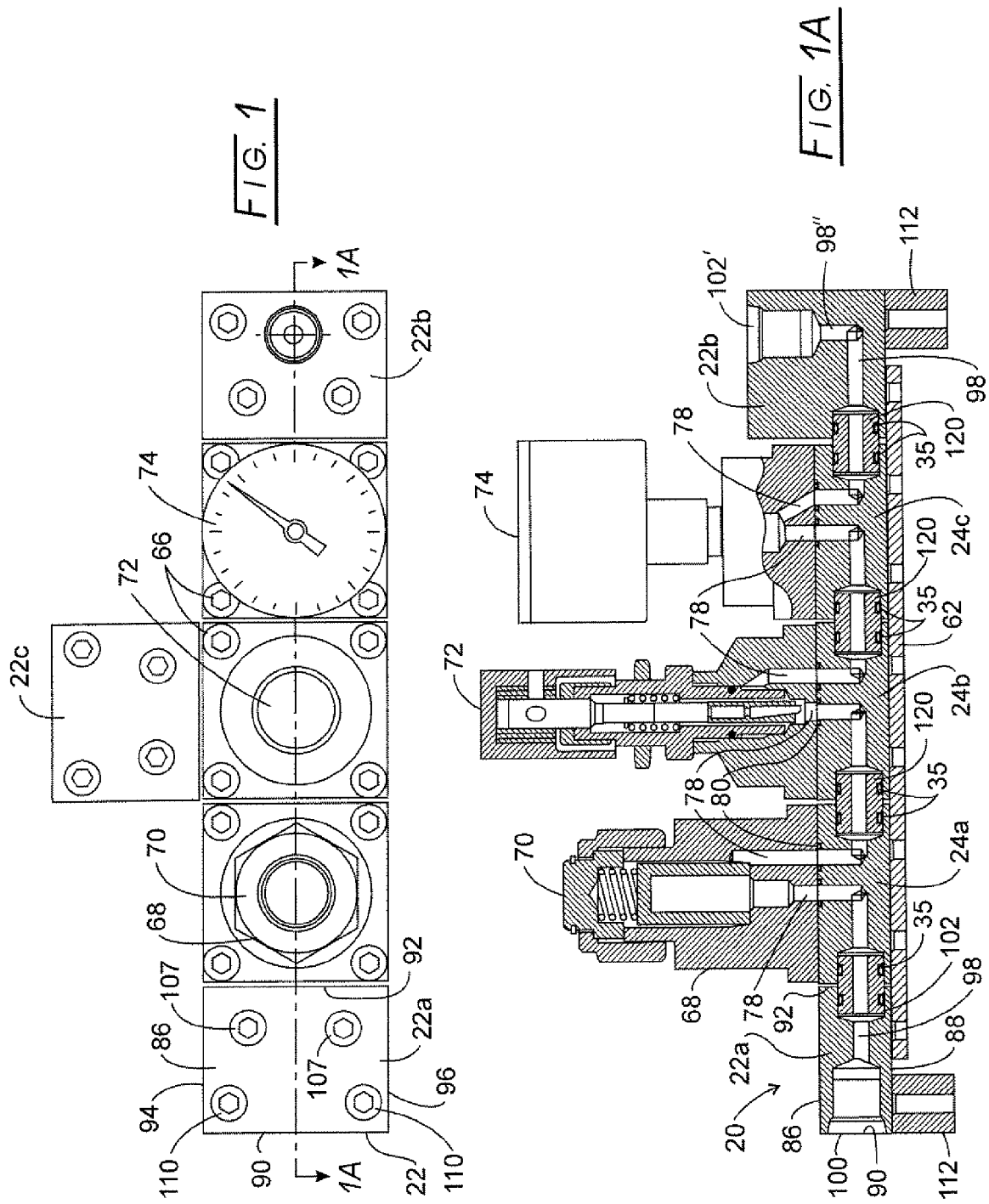

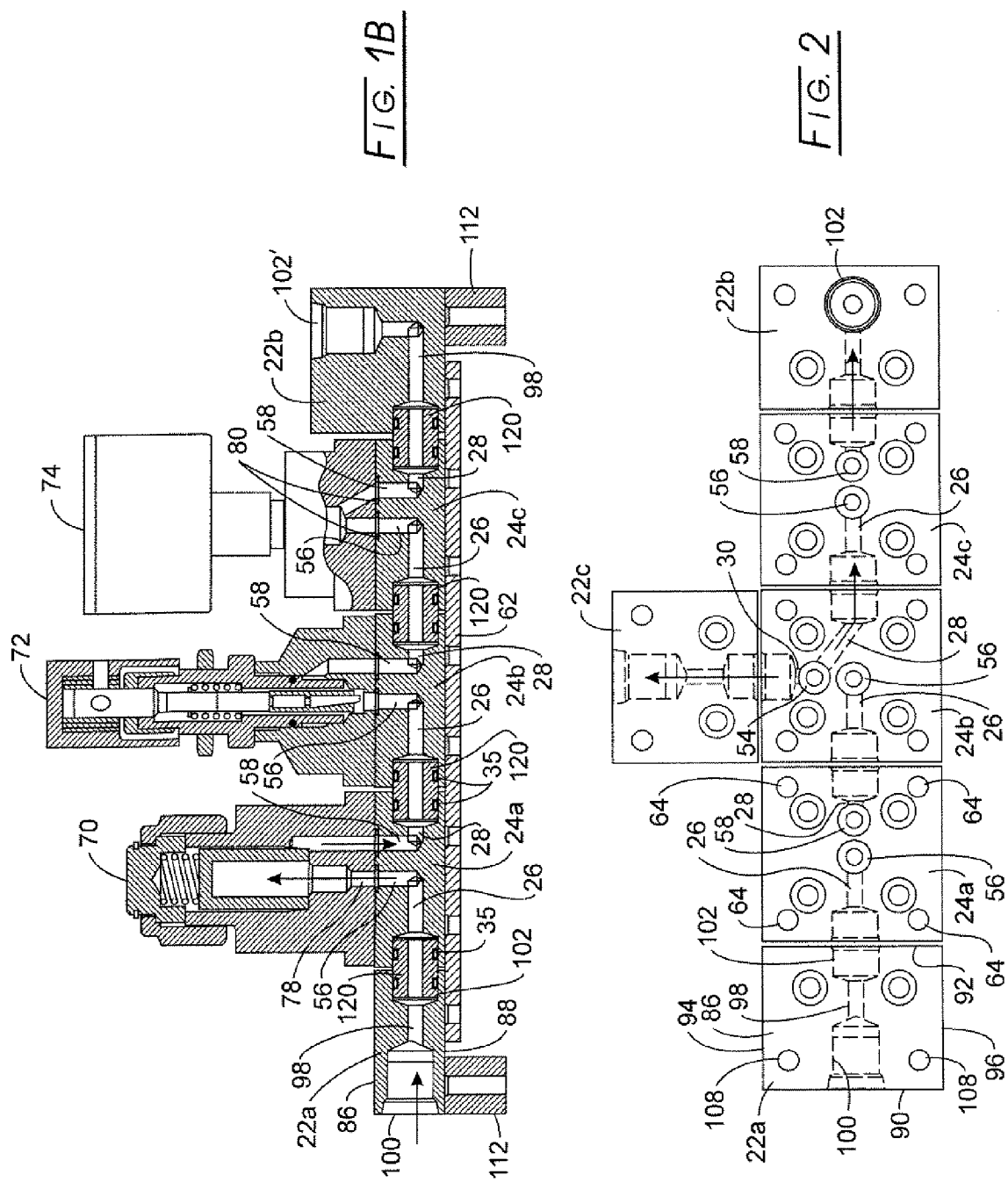

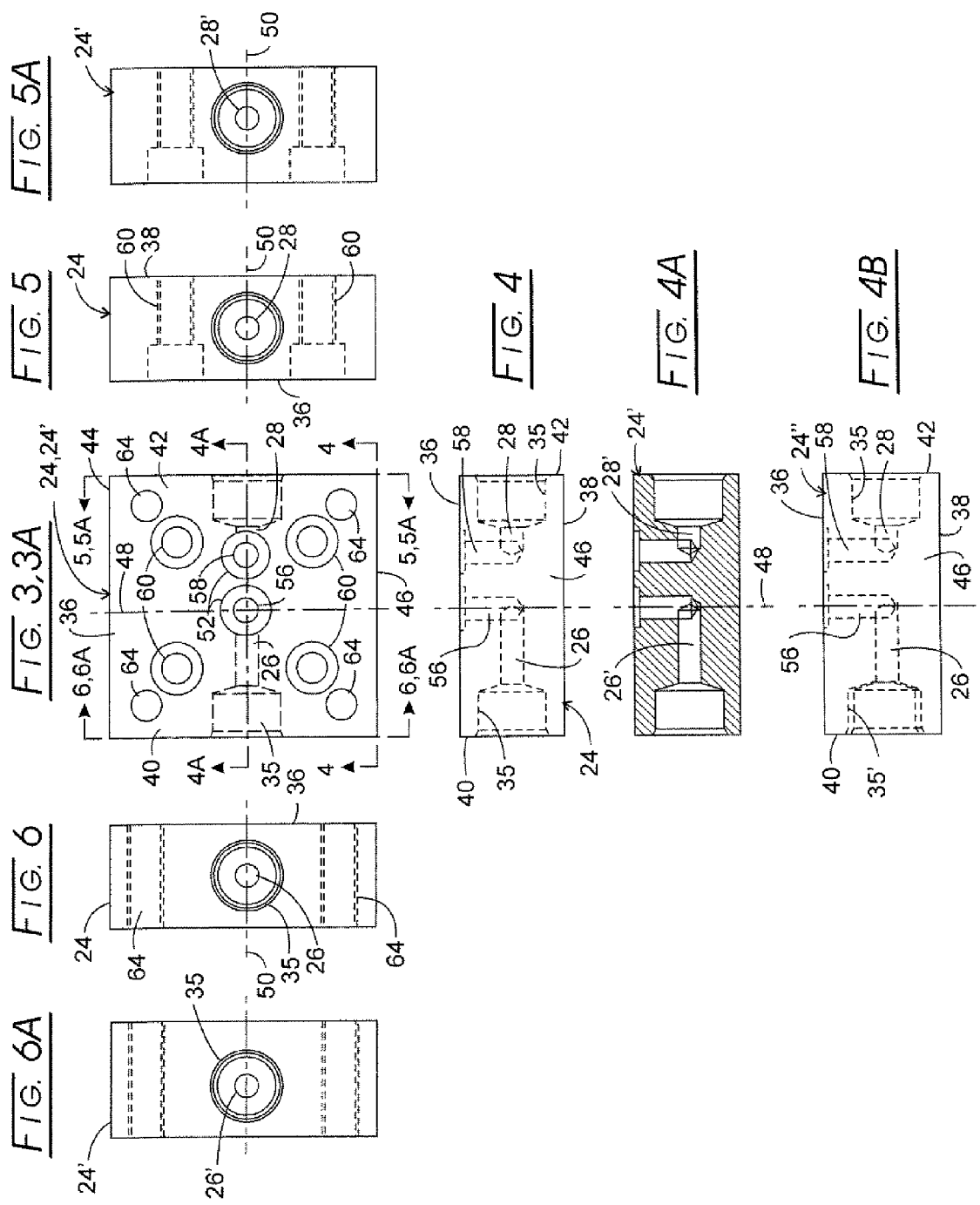

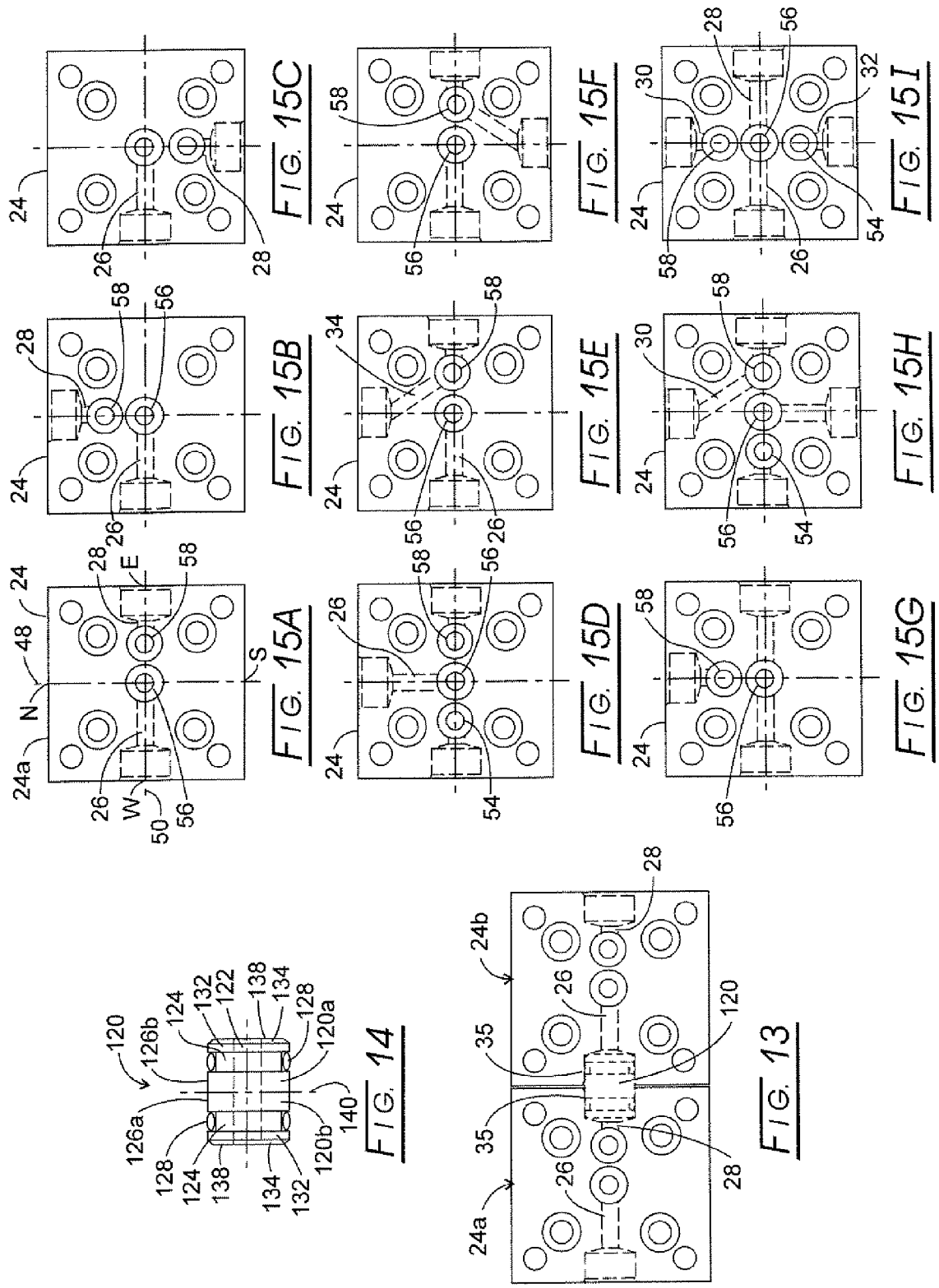

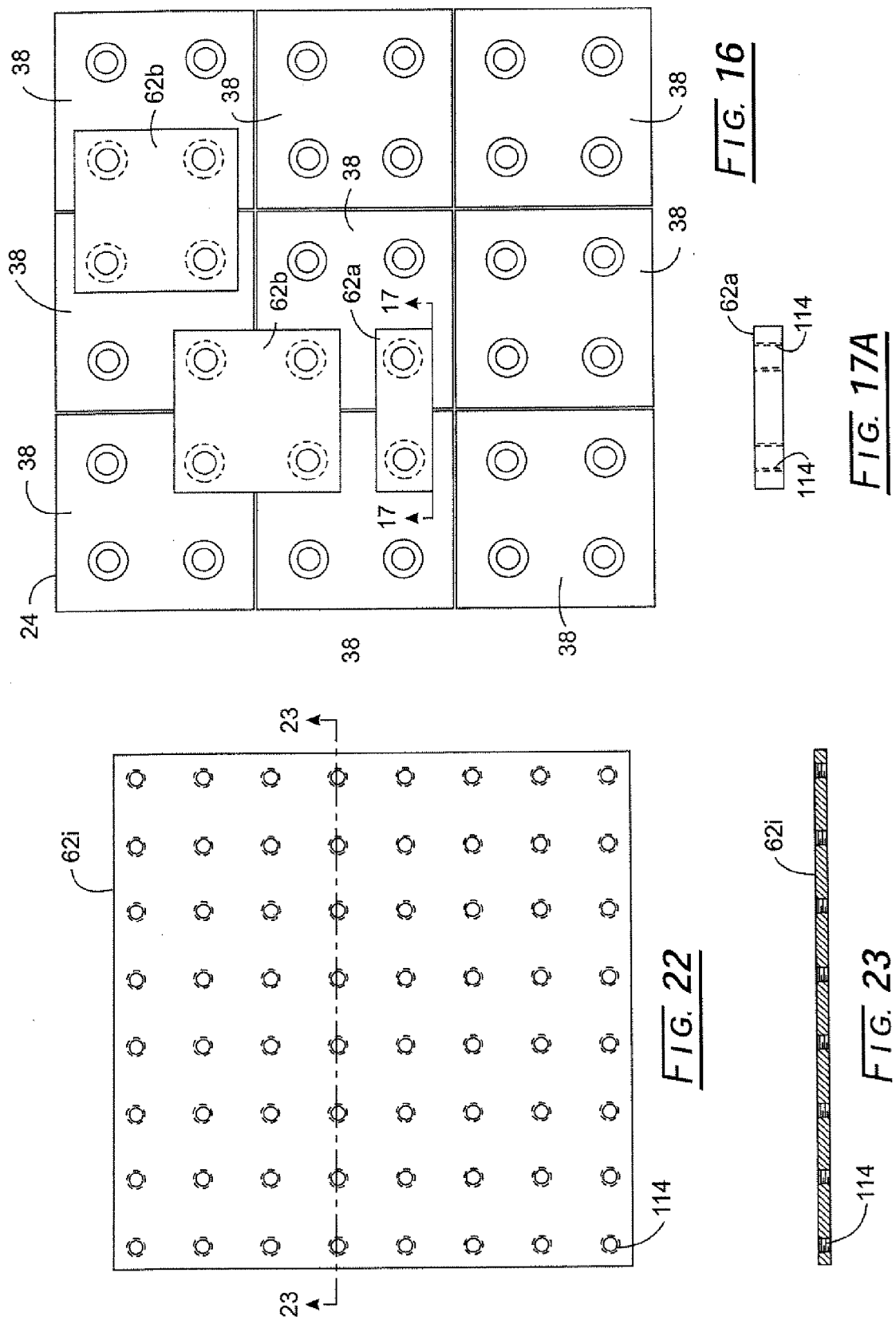

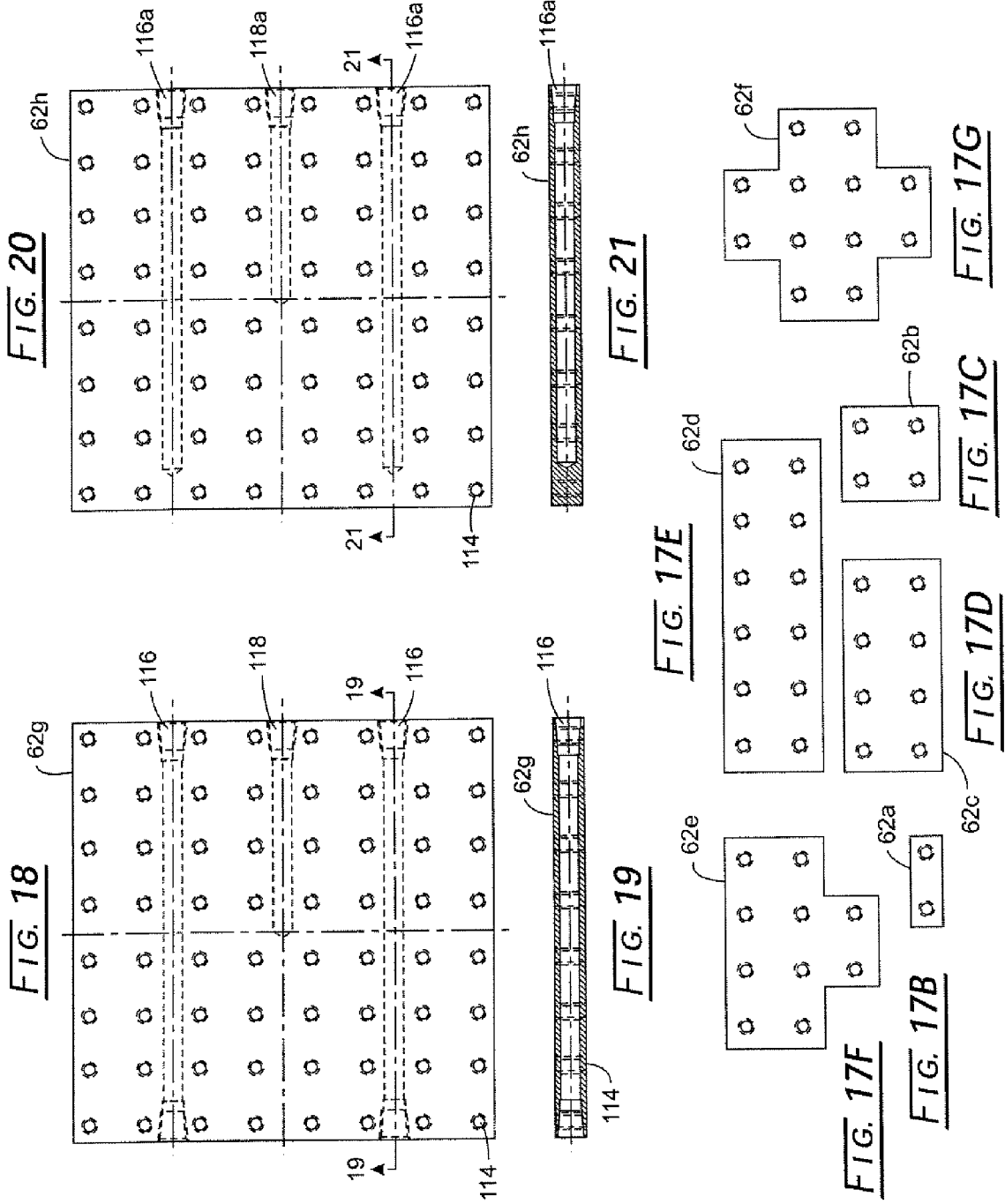

MODULAR COMPONENT CONNECTOR SUBSTRATE ASSEMBLY SYSTEM

CROSS-REFERENCE TO RELATED CASES

The present application claims the benefit of the filing date of U. S. Provisional application Ser. No. 60/493,161 filed Aug. 7, 2003, the disclosure of which is incorporated herein by reference.

FIELD OF THE INVENTION

The present invention pertains to a modular component connector substrate system assembly for readily surface mounting thereon of differing types of fluid control components that are generally utilized in fluid measurement and control systems, for example, in industries such as chemical processing, pharmaceutical, biological and petrochemical and the like.

BACKGROUND OF THE INVENTION

Surface-mount technology is a design concept and layout that permits any type of fluid control component, such as a valve, filter, regulator, etc., to be surface-mounted or affixed to an underlying substrate in any desired combination. The substrate provides connections to other fluid control components, with the interface geometry for surface-mounting the fluid control components being in compliance with ISA specification SP-76 which will be described in more detail later.

Current state of the art technology substrate products generally utilize either welded or bolted connections to contiguous substrates. The welded systems, such as the one set forth in published European Patent Application EP 1 291 636 A2, have the disadvantage of being unable to disassemble the unitary substrate system in order to reconfigure the surface-mounted system or for maintenance of the substrate components. Bolted systems require a second layer or plane of substrates below the first layer, that provides the attachment for the fluid control components in order to change the direction of the flow of the fluid medium from the linear to another direction.

Some current designs of prior art technology are based upon maintaining fluid medium flow in but one direction N-S (North to South), for example, within the same plane and within the same substrate. In order to change directions, e.g., E-W (East to West), this requires a plane change, with this plane change not taking place within the same substrate. In terms of function, a fluid medium flows downward to a second plane, below the substrate plane; flows E-W, or N-S as the case may be, to a contiguous substrate; and then flows back up into the contiguous substrate located on the substrate plane.

Other prior art designs, including that of noted EP 1 291 636A2, have a fluid medium flow in all compass directions (N-S-E-W) within the same plane. However, this fluid medium flow takes place, not within the substrate, but rather in a further plane located below the substrate plane. Thus, in terms of function, a fluid medium first flows through the substrate, then downwardly to a second plane below the substrate plane, then flows directionally (N-S-E-W) to a further location within this second plane which is contiguous or adjacent, but below, the substrate plane, and finally flows back upwardly into a substrate.

Both types of directional change of flow require twice the typical number of components and related bolting (along with welding) as compared to that of the present invention.

Thus, the currently available prior art surface-mount systems have a plurality of shortcomings, including that most installations are one-of-a-kind and require only a few of the same type of sampling or analysis systems, so that most of these installations are of the custom or semi-custom type. Such systems typically involve a large number of components and/or expensive custom machining thereof as well as high assembly/installation costs. Generally, the design procedures are also complex.

There remains an unfulfilled need for improved fluid-flow systems that overcome the stated remaining problems. The present invention fills these needs in addition to providing the additional advantages set forth hereinafter.

SUMMARY OF THE INVENTION

The present invention introduces an improved substrate design and connection system that increases configuration flexibility, reduces the number of required components, minimizes both fluidic pressure losses and the internal volume requirements as well as improving maintenance capabilities.

The present invention utilizes a unique interlocking pressure connector for substrate block-substrate block and substrate block-end block pressure connections. This feature provides a flexible sealing device that is easily assembled and provides a rigid connecting member between contiguous blocks. It also allows for a "floating" effect between the blocks that aids in block alignment and overall assembly quality. The pressure connector is sealed on each end via toroidal seal using standard O-ring sizing in order to minimize compatibility issues.

In addition, the adaptability of the interlocking pressure connector also permits fluid medium flow to be directed in any compass direction. As an example, if the fluid medium flow is from the south, it can be directed outwardly in one or more of the northerly, easterly or westerly directions and still remain in the same plane. This greatly increases the flexibility of the overall system and reduces the overall component requirements thereof. Inasmuch as in the present invention all of the fluidic connections are in but a single plane, the bottom surfaces of the connected substrates are all in the same plane and thus present a flat planar surface that is ideal for the attachment of temperature maintenance systems for heating and/or cooling, if so desired.

Another feature of the system assemblies of this invention relates to the interchangeable field connections. As previously noted, current systems connect via the use of tube stubs or similar structures intended for welding connection. Such connection methods are not only expensive and limited by the availability of weld fittings, but also increase the envelope dimension of the overall system. Typically, space is at a premium in areas where such systems are used, thus the ability to provide a system with a smaller footprint is very advantageous. The field connections for use with the present invention can be offered in a variety of connection types (compression, pipe, etc.) and styles (in-line, elbow, etc.).

Finally, a major advantage of the present invention is the ability to readily reconfigure an already existing system. Since only a minimal number e.g., for example, about ten (although statistically there are up to about forty different possibilities) of basic substrate configurations are necessary to build any desired fluid flow configuration, an existing footprint (consisting of any number of substrates) can be disassembled and subsequently reconfigured and reassembled into a different footprint configuration. In addition, the substrates can also be used or reused in other systems.

It is a feature of one embodiment of the present invention to provide a modular component connector substrate system assembly for mounting thereon of at least two fluid control components of a fluid flow system, the assembly comprising in combination: at least two substrate blocks each substrate block including a body having a top face, a bottom face, spaced lateral side faces and spaced longitudinal end faces; the substrate block having first and second conduits, substantially parallel with the top and bottom faces, each conduit terminating at one end in a different one of the substrate block lateral side and longitudinal end faces; each substrate block further having third and fourth conduits, substantially perpendicular to the top face, with an outer end of each of the third and fourth conduits terminating in the top face and another end of each of the third and fourth conduits merging into another one of the first and second conduits, respectively; the at least two substrate block bottom surfaces residing in the same plane; a fluid control component affixed to the top face of each of the at least two substrate blocks, the fluid control component having first and second ports therein, the first and second ports being in fluid communication with the third and fourth conduits, respectively, of the substrate block; and a separate fluid pressure connector fluidically interconnecting adjacent ones of the at least two substrate blocks and fixedly spacing the at least two substrate blocks from, each other at adjacent ones of the side and/or end faces of the substrate blocks.

A further embodiment of this invention includes the addition of at least two spaced and fixed end blocks, each end block including a body having a top face, a bottom face, spaced lateral side faces and spaced longitudinal end faces, each end block having a first bore portion, substantially a parallel with the top and bottom faces, terminating at one end in a first one of the lateral side and longitudinal end faces; each end block also having a second bore portion fluidically interconnected at one end with the first bore portion and at a second end with another one of the remaining side and end faces or the top face; each of the at least two substrate blocks being interposed between the at least two end blocks and fluidically interconnected and fixedly spaced from the at least two end blocks, via additional ones of the fluid pressure connectors, at adjacent ones of the side and/or end faces of the substrate blocks and the end blocks.

In another embodiment of this invention the one end of each of end block first bore portions and the one end of at least one of the substrate block first and second conduits includes a recess portion of a predetermined size, depth and shape; and the pressure connector takes the form of a longitudinally apertured body of a predetermined size, and shape, the opposite ends of which are adapted to be sealingly received within adjoining ones of the recess portions.

In an additional embodiment both the recess portions and the pressure connector are substantially cylindrical in shape, with the longitudinal extent of the pressure connector being at least twice the longitudinal extent of one of the recess portions. Specifically, the pressure connector includes a central peripheral land portion and two spaced peripheral edge land portions, separated by recessed peripheral grooves; and a resilient annular seal member positioned within each of the grooves for sealingly interacting with a peripheral surface of the surrounding recess portions. The pressure connector edge land portions each preferably include a beveled edge surface terminating at an annular end surface of the pressure connector and the seal member comprises an O-ring.

In a further embodiment, each of the at least two substrate blocks further includes a plurality of spaced first vertical through bores extending from the top face to the bottom face. One assembly of this invention includes a mounting plate, abutting the bottom faces of the at least two substrate blocks, having a plurality of spaced first apertures, aligned with the plurality of spaced first vertical through bores; and a plurality of first attachment members within the first vertical through bores for joining the substrate blocks to the mounting plate.

In a still further embodiment of this invention, the mounting plate includes multiple interior channels for conducting fluid-temperature-controlling media therethrough or for the insertion of heating elements therein.

In an additional embodiment, each of the end blocks and the substrate blocks further includes a plurality of spaced second vertical through bores extending from the top faces to the bottom faces. Furthermore, the fluid component includes a plurality of spaced third vertical through bores, aligned with the plurality of spaced second vertical through bores of the substrate block; and a plurality of second attachment members, extending through the third plurality of vertical through bores, into the plurality of spaced second through bores of the substrate block for fixedly attaching the fluid control component to the substrate block.

In the several embodiments of this invention, the end block first and second bore portions and the substrate block first and second conduits serve in one of an inlet and outlet fluid flow capacity, depending upon the direction of movement of a fluid medium flowing through the assembly.

In still another embodiment, each of the at least two substrate blocks is provided with a plurality of first and second conduits, each conduit terminating at a different one of the substrate block lateral side and/or longitudinal end faces; with the pluralities of first and second conduits being located in a common plane, each of the pluralities of first and second conduits being in fluid communication with at least one port of a plurality of the first and second ports within the fluid control component affixed to each substrate block.

In the several embodiments, the pluralities of first and second conduits in the substrate blocks and/or of the end blocks are either equally or unequally spaced from, as well as parallel to, the top and bottom faces of the substrate blocks.

A different embodiment of this invention pertains to an improvement in a modular component connector substrate system assembly for mounting thereon of at least two fluid control components of a fluid flow system, wherein the assembly includes at least two substrate blocks, each substrate block having spaced parallel top and bottom faces, spaced parallel lateral side faces and spaced parallel longitudinal end faces; each substrate block having first and second conduits, substantially parallel with the top and bottom faces, each conduit terminating at one end in a different one of the substrate block lateral side and longitudinal end faces; each of the substrate blocks further having third and fourth conduits, substantially perpendicular to the top face, with an outer end of each of the third and fourth conduits terminating in the top face and another end of each of the third and fourth conduits merging into another one of the ends of the first and second conduits; the at least two substrate block bottom surfaces residing in the same plane; and having a fluid control component affixed to the top face of each of the substrate blocks, the fluidic control component having first and second ports therein, with the first and second ports being in fluid communication with the third and fourth conduits, respectively, of an associated substrate block, wherein the improvement comprises:

a separate fluid pressure connector fluidically interconnecting adjacent ones of the at least two substrate blocks and fixedly spacing the substrate blocks from each other at adjacent ones of the side and/or end faces of the substrate blocks, wherein each of the substrate blocks is provided with a plurality of first and second conduits, each of the conduits terminating at a different one of the substrate block side and longitudinal end faces; with the pluralities of first and second conduits being located in a common plane within the substrate block, each of the pluralities of first and second conduits being in fluid communication with at least one of the first and second ports within the fluid control component affixed to each of the associated substrate blocks.

A still further embodiment further includes the addition of at least two spaced and fixed end blocks, each end block including a top face, a spaced bottom face, spaced lateral side faces and spaced longitudinal end faces, each end block having a first bore portion, substantially parallel with the top and bottom faces, terminating at one end in a first one of the lateral side and end faces; each end block further having a second bore portion fluidically interconnected at one end with the first bore portion and at a second end with another one of the remaining side and end faces or the top face; the at least two substrate blocks being interposed between the end blocks, and fluidically interconnected and fixedly spaced from the end blocks, via additional ones of the fluid pressure connector, at adjacent ones of the side and/or end faces of the substrate blocks and the end blocks.

In another variation of the improved assembly of this embodiment, the one end of each of the end block first bore portions and the one end of each of the substrate block first and second conduits includes a recess portion of a predetermined size, depth and shape; and the pressure connector takes the form of a longitudinally apertured body of a predetermined size and shape, the opposite ends of which are adapted to be sealingly received within adjoining ones of the recess portions. Preferably, both the recess portions and the pressure connector are substantially cylindrical in shape, with the longitudinal extent of the pressure connector being at least twice the longitudinal extent of one of the recess portions. Specifically, the pressure connector includes a central peripheral land portion and two spaced peripheral edge land portions, separated by recessed peripheral grooves; and a resilient annular seal member positioned within each of the grooves for sealingly interacting with a peripheral surface of the surrounding recess portion. Further features and advantages of the present invention will become apparent to those skilled in the art upon review of the following specification in conjunction with the accompanying drawings.

BRIEF DESCRIPTION OF THE DRAWINGS

FIG. 1 is a schematic top plan view of a plurality of fluidic components mounted on a first embodiment of a modular component connector substrate system assembly of the present invention.

FIG. 1A is a partial vertical sectional view of the assembly of FIG. 1 taken generally along line 1A—1A thereof.

FIG. 1B is similar to FIG. 1A with the addition of fluid flow directional lines.

FIG. 2 is a schematic top plan view of the first embodiment of the assembly FIG. 1 without the fluidic components of FIG. 1 mounted thereon.

FIG. 3 is a top plan view of a basic substrate component of the assembly of this invention.

FIG. 4 is a vertical longitudinal side view of the substrate component of FIG. 3, looking in the direction of line 4—4 thereof.

FIG. 5 is a simplified transverse view of one side of the substrate component of FIG. 3, looking in the direction of line 5—5 thereof.

FIG. 6 is a simplified transverse view of another side of the substrate component of FIG. 3, looking in the direction of line 6—6 thereof.

FIG. 3A is a top plan view, which is the same as that of FIG. 3, of a further embodiment of a basic substrate component of the assembly of this invention.

FIG. 4A is a vertical longitudinal sectional view of the substrate component of FIG. 3A, taken along line 4A—4A thereof.

FIG, 4B is a slightly modified version of the structure of FIG. 4.

FIG. 5A is a simplified transverse view of the substrate component of FIG. 3A, looking in the direction of line 5A—5A thereof.

FIG. 6A is a simplified transverse view of another side of the substrate component of FIG. 3A, looking in the direction of line 6A—6A thereof.

Figure 7:
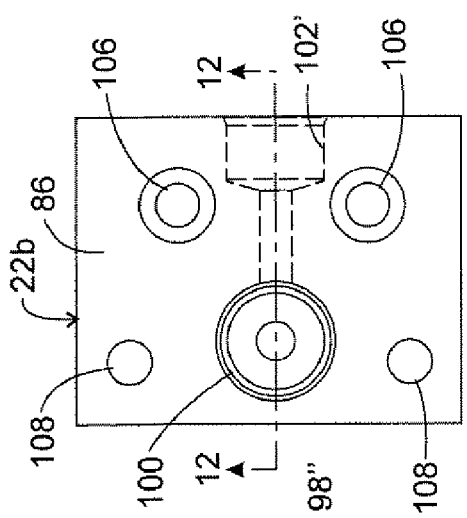

FIG. 7 is a top plan view of a first embodiment of an inlet/outlet end block of the assembly of this invention.

Figure 8:
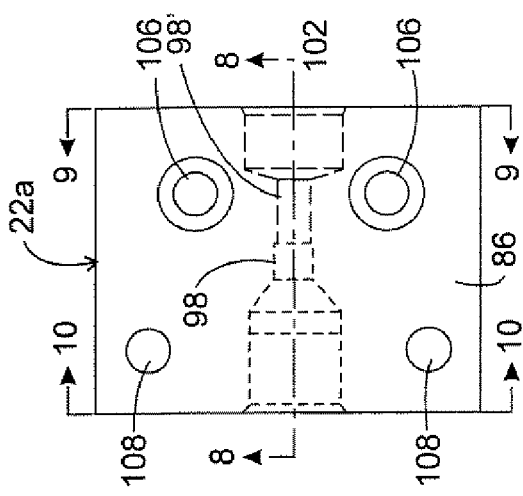

FIG. 8 is a longitudinal sectional view of the end block of FIG. 7, taken along line 8—8 thereof.

Figure 9:
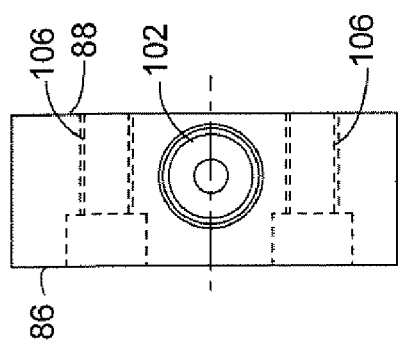

FIG. 9 is a simplified transverse view of one side of the end block of FIG. 7, looking in the direction of line 9—9 thereof.

Figure 10:
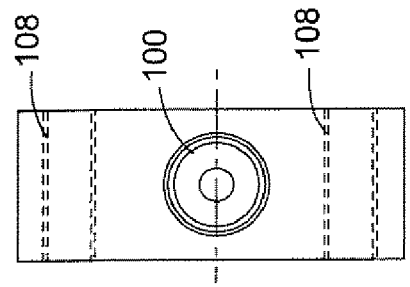

FIG. 10 is a simplified transverse view of another side of the end block of FIG. 7, looking in the direction of line 10—10 thereof.

Figure 11:
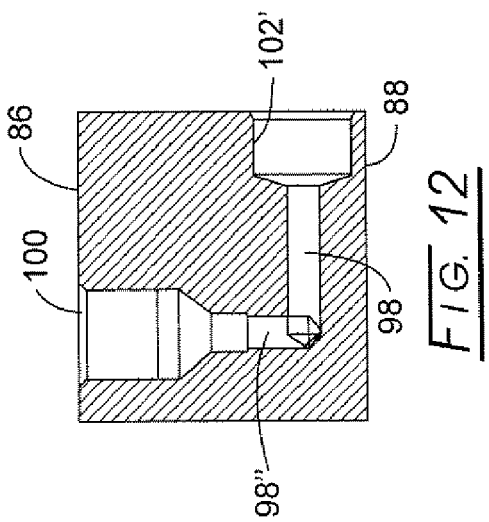

FIG. 11 is a top plan view of another embodiment of an inlet/outlet end block of the assembly of this invention.

Figure 12:
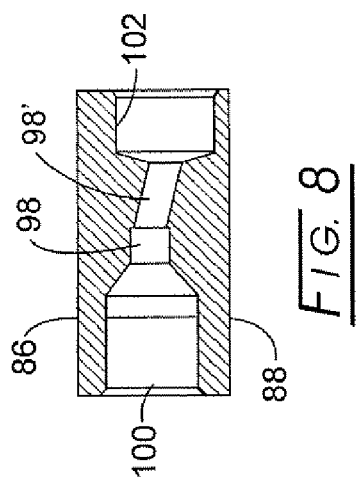

FIG. 12 is vertical longitudinal sectional view of the outlet block of FIG. 11, looking in the direction of line 12—12 thereof.

FIG. 13 is a top plan view of two adjoining substrate components that are connected by means of the interposed pressure connector also shown in FIG. 14.

FIG. 14 is an elevational view of a pressure connector for adjacent substrate components as well as substrate components and adjacent end blocks.

FIGS. 15A–15I are top plan views of nine differing substrate components which, among others, are utilized in component connector substrate system assemblies of this invention.

FIG. 16 is a bottom plan view of a plurality of adjoining substrate assemblies, with the predetermined gaps therebetween being maintained by one or more alignment and/or mounting plates.

FIG. 17A is an end view of a 1×2 alignment plate, looking in the direction of line 17—17 in FIG. 16

FIGS. 17B–17G are top plan views of six differing alignment plates which are among those utilized in this invention.

FIG. 18 is a schematic top plan view of one type of a temperature-controllable 8×8 alignment plate.

FIG. 19 is a vertical sectional view of the alignment plate of FIG. 18, taken along line 19—19 thereof.

FIG. 20 is a schematic top plan view of another type of a temperature-controllable 8×8 alignment plate.

FIG. 21 is a vertical sectional view of the alignment plate of FIG. 20, taken along line 21—21 thereof.

FIG. 22 is a top plan view of a "pegboard" type of an alignment and/or mounting plate utilized for mounting and alignment purposes.

FIG. 23 is a vertical sectional view of the alignment/mounting plate of FIG. 22, taken along line 23—23 thereof.

DETAILED DESCRIPTION OF THE PREFERRED EMBODIMENTS

Referring now to the drawings, particularly to FIGS. 1, 1A, 1B, and 2, there is depicted therein a first embodiment of a modular component connector substrate system assembly 20 of this invention that finds utility for fixedly surface mounting thereon of an interlocking fluid flow system.

Modular component connector substrate system assembly 20 (hereinafter designated "assembly"), is substantially comprised of a plurality of sealingly, fluidically interconnected and/or interlocked modular components including at least two end blocks 22 in the form of at least one inlet block and at least one outlet block, with each such block having a shape such as that of a hexahedron, for example, and being capable of serving as either an inlet block or an outlet block, depending upon the direction of flow of the fluid medium being transferred.

Intermediately disposed between end blocks 22 is at least one substrate block 24. FIGS. 1, 1A, 1B and 2 disclose three end blocks 22a, 22b and 22c, again of a shape such as a hexahedron, that can function as either one or more inflow blocks or one or more outflow blocks, again depending upon the direction of fluid medium flow. As best seen in FIG. 2, in one embodiment of this invention, end block 22a functions as an inlet block while blocks 22b and 22c can function as outlets blocks, either singly or together, as will be more fully described hereinafter.

It should be clear from a review of FIGS. 1 and 2 that the flow through end blocks 22 can be longitudinal, or in-line, as in end block 22a and 22c, or that the flow can change direction as is the case with block 22b where the fluid inlet and outlet directions are substantially perpendicular to each other as well as changing from flowing in a horizontal plane to flowing in a vertical plane. What is important is that the direction of the fluid medium flow occurs wholly within each end block, irrespective of whether the change of flow direction occurs in the same plane, such as turning right or left, for example, in a horizontal plane (not shown per se in block 22b) or whether there is a change in planes, such as shown in end block 22b.

As best seen in FIG. 2, sealingly and fluidically interconnected and/or interlocked with end blocks 22a, 22b and 22c, in this exemplary embodiment, are three substrate blocks 24a, 24b and 24c. Since the structural details and operational functions thereof will be discussed in more detail later, particularly with reference to the various embodiments shown in FIGS. 15A–15I, it is deemed sufficient, at this time, to note that, in the FIG. 2 depiction, substrate blocks 24a and 24c are each provided with longitudinally-aligned inlets or inlet apertures/conduits 26 and outlets or outlet apertures/conduits 28 whereas substrate block 24b is provided with a longitudinally-directed inlet 26, an angled outlet 28, and a transversely-directed outlet 30. Again, as to whether such apertures function as inlets or outlets depends upon the direction of the fluid medium flow.

Turning now to FIGS. 3–6 and FIGS. 3A–6A, there are shown several views of two slightly differing embodiments of a substrate block, such as a hexahedral block 24, (FIGS. 3–6) and a substrate block 24' (FIGS. 3A–6A). Since the top plan view for both embodiments is the same, it is shown but once for both and serves as both FIG. 3 and FIG. 3A. Each substrate block 24 has a top face 36, a bottom face 38, a first lateral end face 40, a second lateral end face 42, as well as a first longitudinal side face 44 and a second longitudinal side face 46. In FIGS. 3, 3A, lateral end faces 40, 42 are parallel to vertical centerline 48 while longitudinal side faces 44, 46 are parallel to horizontal centerline 50. The main difference between substrate blocks 24 and 24' is that in block 24 the end or inlet/outlet ports 26, 28 (FIGS. 4,5 and 6) are centered both horizontally and vertically. Stated another way, ports 26 and 28 are equally spaced from block top face 36 and bottom face 38. In ports 24', ports 26' and 28', as best seen in FIGS. 4A, 5A and 6A are not equally spaced between top and bottom faces 36 and 38, respectively. Except for the noted difference in port spacings, blocks 24 and 24' are the same and like numerals apply to like parts. The unequal port spacing in blocks 24' results from specific fluid pressure requirements for particular applications. In addition to the noted longitudinally-directed inlets/outlets 26, 28, substrate blocks 24 are provided with vertical fluid passages 56, 58, that join and are thus in full fluid connection with inlets/outlets 26, 28, respectively, as best seen in FIGS. 1B and 4. Vertical fluid passage 56 is centered relative to substrate block centerlines 48, 50 while the at least one additional outer fluid passage 58 is centered relative only one or the other of centerlines 48, 50, respectively.

Furthermore, as best seen in FIGS. 3 and 5, each substrate block 24 also includes four counterbored, relative to substrate block top face 36, through bores 60 whose function it is to freely receive the heads and the adjoining lengths of threaded shanks of bolts or fasteners (not shown per se) for operatively securing substrate blocks 24 to an apertured and threaded alignment plate 62, to be discussed hereinafter relative to FIGS. 1A and 16–19.

Finally, again as best seen in FIGS. 3 and 6, each substrate block 24 is further provided with four threaded through bores or apertures 64 whose function it is to receive threaded shank portions of bolts or fasteners 66 (FIG. 1) for operatively securing fluid components 68 to substrate blocks 24. Typical examples of such fluid components 68 are valves of different types, filters, flowmeters, heaters, pressure transducers and regulators, flow controllers, temperature sensors, instrument, analyzers and the like. Both the structures and operational modes of these fluid components, such as filter 70, metering valve 72 and pressure gauge 74, are well known in the art and form no part of the present invention. The four attachments through bores 64 are arranged in a rectangular pattern as illustrated in FIG. 3. The mechanical connections between substrate blocks 24 and fluid components 68 at the fluid component attachment bores 54, 56, 58 are preferably made and spaced and dimensioned, etc. so as to conform to the provisions of SEMI 2787.1 and ANSI/ISA Specification SP76.00.02, 2002 (known as "SP76" in the industry) which sets forth, among other things, the arrangement of ports, physical envelope constraints, mounting hole location and sizes, and the like, for surface-mounted fluid-control systems. An advantage of the present invention is that, if such specifications are revised, etc., or other specifications are adopted in the future, substrate blocks 24 and inlet blocks 22 may readily be adapted to such new specifications.

Each one of fluid components 70, 72 and 74 have one or more internal ports 78 through which the fluid medium flows into or out of these fluid components. The ports 78 of each fluid component are in fluid communication with one or more of the fluid flow passages 54, 56 and 58 in substrate blocks 24. The fluid connections between the ports 78 and substrate block fluid passages 54, 56 and 58 are sealed via annular seals 80 (FIGS. 1A, 1B) that preferably reside in recesses or counterbores in passages 54, 56 58. Seals 80 preferably take the form of "O" rings of resilient, for example elastomeric or polymeric, composition but could also be of metallic construction depending upon the type of fluid medium being processed.

The architecture of substrate blocks 24, while conforming within the previously-noted SP-76 specification guidelines, may take a plurality of configurations, including but not limited to those shown in FIGS. 15A to 15I. Specifically, FIG. 15A again shows substrate block 24a that has already been previously described as having single, horizontally aligned inlet/outlet ports or conduits 26, 28 that merge into internal vertical fluid passages 56, 58, respectively. This can be analogized to a compass coordinate wherein the inlet to outlet direction is aligned E-W (East-West). A rotation of 90 degrees of the conduits of FIG. 15A will result in an N-S (North-South) alignment such as that shown in FIG. 15I wherein the conduits 30, 32 are N-S aligned. Rotation of but one of the inlet/outlet conduits of FIG. 15A can result in the perpendicular arrangements shown in FIGS. 15B and 15C.

FIGS. 15D to 15G show examples or embodiments of either multiple inlet/single outlet structures or multiple single outlet/inlet structures with differing directional alignments utilizing three of the four N, S, E, W directions, while having their conduits coupled to two (FIGS. 15E, 15F and 15G) or three (FIG. 15D) vertical fluid passages 54, 56 and 58. Finally, FIGS. 15H and 15I are representative embodiments of examples of substrate blocks having both multiple inlet/multiple outlet constructions or configurations, with differing directional alignments utilizing all four N, S, E, W directions while utilizing one center vertical fluid passage 56 and two outer fluid passages 54, 58. In each of the noted constructions there is always a center vertical fluid passage 56 and at least one adjacent outer vertical fluid passage 54 and/or 58.

Turning again to preferably hexahedron-shaped end blocks 22, such as similar end blocks 22a and 22c, as best illustrated in FIGS. 1, 1A, 1B and 2, have a top face 86, a bottom face 88, a first lateral end face 90, a second lateral end face 92, as well as a first longitudinal side face 94 and a second longitudinal side face 96. Each of end blocks 22 is also provided with a longitudinal through bore 98, extending from end face 90 to end face 92, with one embodiment 22a having bore 98 equally spaced from and parallel with top and bottom end faces 86, 88, respectively. The outer end of bore 98, terminating at end face 90, is provided with a threaded recess or counterbore 100, such as, e.g., an 0.125 inch FNPT female pipe thread, while the inner end of bore 98, terminating at end face 92, is provided with a smooth, enlarged cylindrical recess or bore 102.

As best illustrated in FIGS. 7 and 9, each end block 22 is also provided with two, laterally-spaced, and counterbored relative to end block top surface 86, through-bores 106 whose function it is to freely receive the heads and adjoining lengths of a threaded bolt or fastening member 107 (FIG. 1) for operatively securing end blocks 22 to an apertured and threaded alignment plate 62, to be discussed hereinafter. Finally, as best illustrated in FIGS. 7 and 10, end blocks 22 are also provided with two laterally spaced through bores 108 whose function it is to allow the insertion of fasteners 110 (FIG. 1) for the attachment, to block bottom surface 88 thereof, of one or more leg or support members 112.

FIGS. 8–10 disclose an end block embodiment 22a', with the main difference between blocks 22a and 22a' being that through bore 98 of the latter has an angled portion 98' leading to inner cylindrical recess or counterbore 102', as a result of which recess 102' is not centered between top and bottom walls 86, 88, respectively.

FIGS. 11 and 12 disclose further structural details of another end block embodiment, namely end block 22b which is also shown in FIGS. 1, 1A, 1B and 2. The previous description, relative to end block 22a also applies to end block 22b except that bore 98 has a perpendicular portion 98" and that the outer end 102' thereof is located in block top face 86, rather that in block end face 90. This construction provides an upwardly-directed threaded (e.g., an 0.125 inch FNTP female pipe thread) vertical inlet/outlet port which may be required in certain installations. The sizing, dimensioning and aperture locations of the noted several end block embodiments also conform to the noted SP-76 specifications.

Returning now to the plurality of embodiments of substrate blocks 24 in FIGS. 15A to 15I, it should be understood that these substrate blocks have, parallel with top and bottom surfaces 36, 38, at least two vertical conduits that perform, depending upon the direction of flow of the fluid medium flow, either inlet or outlet functions. These conduits may be longitudinally aligned, such as conduits 26 and 28 (FIG. 15A); or laterally aligned, such as conduits 30 and 32 (FIG. 15I); perpendicular to each other (FIGS. 15B, 15C); or angled, such as conduits 26 and 34 (FIG. 15E); or have various combinations thereof. As previously noted, the inner ends of these conduits 26, 28, 30, 32 and 34 always merge into at least one of the vertical fluid passages 54, 56 and 58. The outer ends of conduits 26, 28, 30, 32 and 34 each merge into a smooth, enlarged diameter, cylindrical recess or bore 35 having substantially the same diametral size and axial extent as that of corresponding bore or recess 102 in each of end blocks 22, 22a, 22b and 22c.

As best illustrated in FIGS. 1A and 1B, substrate blocks 24a and 24b are sealingly fluidically interconnected via an intermediate pressure connector 120, best seen in full detail in FIG. 14. Connector 120 preferably takes the form of a circular cross-sectional rod or coupling having a longitudinal, smooth aperture 122 and equally axially-spaced recessed peripheral grooves 124, separated by two similar but adjoining intermediate cylindrical peripheral land portions 126a, 126b. Grooves 122 are adapted to each receive a resilient "O" ring 128, of a composition similar to that of previously-defined "O" rings 80, whose lateral radial outermost curved surfaces extend radially outward from grooves 124. Two opposed, cylindrical, edge land portions 132, each having a beveled outer edge 134, separate grooves 124 from opposed annular end wall surfaces 138. Another way of defining pressure connector 120 is that it is comprised of two adjoining, substantially allochiral or mirror-image portions 120a and 120b, seamlessly joined at vertical centerline 140. The outer diameter of each "O" ring 128 is so selected that, upon insertions thereof (as parts of pressure connector portions 120a, 120b) into adjacent and aligned substrate block alignment bores 35, produces an interference fit, resulting in an elastic deformation of each of "O" rings 128. The noted "O" ring deformations not only provide a fluid tight seal between pressure connector 120 and its adjoining substrate blocks 24a, 24b, for example, but also exert a physical retention force for coupling the adjoining blocks 24.

A perusal of drawing FIGS. 1A, 1B, will also make it clear to one skilled in the art that pressure connectors 120 are also utilized for fluidically, sealingly coupling or connecting substrate blocks 24 with recess bores 102 in adjoining inlet/outlet end blocks 22. The depth of axial entry of pressure connector portions 120*a*, 120*b* into adjacent bores 35 and/or adjacent bores 35 and 102, is limited by the physical abutments of connector end walls 138 against the inner end walls of these bores, as best seen in FIG. 13. The total axial length of connector 120 is preferably slightly greater than that that of the combined axial lengths of bores 35 and 102 so that the adjacent substrate and/or end block surfaces do not physically touch each other. There may be some instances, particularly when footprint space is at a premium that it may not be feasible to utilize either one or both of inlet/outlet blocks 22. Under such circumstances one or more of substrate blocks 24 may be modified in the manner shown in substrate block 24" illustrated in FIG. 4B. Specifically, one of the normally smooth cylindrical recesses or bores 35 (FIG. 4) is modified by machining therein of an 0.125 inch FNPT female thread 35' (left end of FIG. 4B) which thus permits the threading thereinto of a respective inlet/outlet fluid media line (not shown) in a manner well known to those skilled in the art.

In order to assure the proper predetermined spacing relative to each other, blocks 22 and 24, in addition to their fluid-tight interconnections via pressure connectors 120 are also joined, at their bottom faces 38 (substrate block 24) and 88 (end blocks 22) via one or more alignment plates 62, best seen in FIGS. 16–19. Specifically, FIG. 16 illustrates a bottom plan view of nine substrate blocks 24 wherein two such blocks are joined to a 1×2 alignment plate 62*a*, having two threaded apertures 114 (FIG. 17A), via two bolts (not shown) extending through substrate block counterbored through bores 60. Also illustrated are examples of 2×2 alignment plates 62*b* which serve to join two and four substrate blocks 24, respectively. End blocks 22 are similarly coupled to substrate plates 62 via bolts 107 (FIG. 1), extending through end block counterbored apertures 106, that are threaded into alignment plate apertures 114.

FIGS. 17B to 17G are top plan views of six differing alignment/mounting plates 62*a*–62*d* which respectively illustrate 1×2; 2×2; 2×4 and 2×6 rectangular plates, together with a T-shaped plate 62*e* and a cruciform-shaped plate 62*f*. These are but examples of typical plates that are utilized in this invention.

FIGS. 18 and 19 illustrate an example of a temperature-controllable 8×8 alignment plate 62*g* which, in addition to threaded apertures 114 is also provided with two full length through channels 116 and a blind half channel 118 for conducting fluid temperature controlled media therethrough and for receiving a temperature measurement device (not shown), respectively.

FIGS. 20 and 21 disclose another 8×8 alignment/mounting plate 62*h* that is similar to plate 62*g* (FIGS. 18, 19), but utilizes blind bores 116*a*, 118*a*, which are adapted for the insertion of electric heating rods or the like and a temperature measurement device (neither shown) for temperature control purposes.

Finally, FIGS. 22 and 23 disclose a "pegboard-type" embodiment of an 8×8 alignment/mounting plate 62*i* which is also provided with threaded apertures 114 that are spaced in accordance with the requirements of the noted SP 76 specification. Such a "square" mounting plate provides an ideal foundation for mounting a modular component connector substrate assembly system of the type set forth in this invention. Mounting plate 62*i* could also be provided with lateral bores, as previously described, for temperature control purposes.

In terms of the materials utilized in the structures of this invention, in addition to the noted resilient "O" rings, the metallic components of the various embodiments may be of any desired composition, but are preferably comprised of stainless steel, such as of a type 304 alloy thereof.

In terms of the operation of the modular component connector substrate system assembly 20 of this invention, this will now be explained with reference to FIGS. 1B and 2 as follows: In FIG. 1B a fluid medium enters inlet end block 22*a* from the left and flows, via intermediate pressure connector 120, into initial substrate block 24*a* and continues vertically upwardly therefrom, via conduits 26 and 56, into and through a fluidic component, namely filter 70. The now-filtered medium then exits from filter 70 via conduits 58, 28 and flows, via a further pressure connector 120, into adjacent substrate block 24*b* and continues vertically upwardly therefrom, via conduits 26 and 56, into another fluidic component, namely metering valve 72 (FIG. 1B). When valve 72 is in the closed position, the flow of the fluid medium stops. Once valve 72 is opened, the fluid medium will flow simultaneously in two different directions as shown in FIG. 2, one direction being lateral, via adjacent outlet end block 22*c* while utilizing a further connector 120. The other direction extends in-line, via yet another connector 120, into longitudinally-adjacent substrate block 24*c*. The fluidic component, mounted on block 24*c*, is a pressure gauge 74 (FIG. 1B) and the fluid medium flows into and out of gauge 74 without obstruction and continues its flow, via an additional connector 120, into outlet end block 22*b* and exits therefrom via bore recess portion 102.

While there are shown and described several presently preferred embodiments of this invention, it is to be distinctly understood that the invention is not limited thereto, but may be otherwise variously embodied and practiced within the scope of the following appended claims.

What is claimed is:

1. A modular component connector substrate system assembly for mounting thereon of at least two fluidic control components of a fluid flow system, said assembly comprising in combination:

a. at least two spaced substrate blocks each substrate block including a body having a top face, a bottom face, spaced lateral side faces and spaced longitudinal end faces; said substrate block having first and second conduits, substantially parallel with said top and bottom faces, each conduit terminating at one end in a different one of said substrate block lateral side and longitudinal end faces; each substrate block further having third and fourth conduits, substantially perpendicular to said top face, with an outer end of each of said third and fourth conduits terminating in said top face and another end of each of said third and fourth conduits merging into another one of said first and second conduits, respectively; said at least two substrate block bottom surfaces residing in the same plane;

b. a fluid control component affixed to the top face of each of said at least two substrate blocks, said fluid control component having first and second ports therein, said first and second ports being in fluid communication with said third and fourth conduits, respectively, of said substrate block; with each of said at least two substrate blocks further including a plurality of spaced first vertical through bores extending from said top face to said bottom face;

c. a mounting plate having a top face thereof abutting the bottom faces of at least two spaced substrate blocks, said mounting plate including a plurality of spaced first apertures, aligned with said plurality of spaced first vertical through bores of said substrate blocks; and a plurality of first attachment members extending through said first vertical through bores and said first apertures for fixedly joining said substrate blocks to said mounting plate, said mounting plate also serving to align said substrate blocks so as to conform same to the centerline distances set forth in a particular industry specification; and d. a separate rigid fluid pressure connector fluidically interconnecting and sealingly joining adjacent ones of said at least two spaced substrate blocks and elastically coupling said at least two substrate blocks from each other at adjacent ones of the sides and/or end faces of said substrate blocks.

2. The assembly of claim 1, further including at least two spaced end blocks, each end block including a body having a top face, a bottom face, spaced lateral side faces and spaced longitudinal end faces, each end block having a first bore portion, substantially parallel with said top and bottom faces, terminating at one end in a first one of said lateral side and longitudinal end faces; each end block also having a second bore portion fluidically interconnected at one end with said first bore portion and at a second end with another one of said remaining side and end faces or said top face; said at least two substrate blocks being interposed and elastically coupled between said at least two end blocks and fluidically interconnected and sealingly joined, via additional ones of said fluid pressure connectors, at adjacent ones of the side and/or end faces of said substrate blocks and said end blocks: and a portion of said mounting plate also abutting said bottom faces of said end blocks, with said pluralities of first apertures thereof being aligned with a plurality of spaced first vertical through bores extending through said end blocks; and a further plurality of said first attachment members extending through said first vertical through bores and said first apertures for also fixedly joining said end blocks to said mounting plate, said mounting plate also serving to align said substrate and end blocks so as to conform same to a predetermined centerline distance set forth in said particular industrial specification.

3. The assembly of claim 2, wherein the one end of each of end block first bore portions and the one end of at least one of said substrate block first and second conduits includes a recess portion of a predetermined size, depth and shape; and said pressure connector takes the form of a longitudinally apertured body of a predetermined size, and shape, the opposite ends of which are adapted to be sealingly as well as resiliently received within adjoining ones of said recess portions.

4. The assembly of claim 3, wherein both said recess portions and said pressure connector are substantially cylindrical in shape, with the longitudinal extent of said pressure connector being at least twice the longitudinal extent of one of said recess portions.

5. The assembly of claim 4, wherein said pressure connector includes a central peripheral land portion and two spaced peripheral edge land portions, separated by recessed peripheral grooves; and a resilient O-ring being positioned within each of said grooves for sealingly and resiliently interacting with a peripheral portions.

6. The assembly of claim 2, wherein each of said pluralities of first vertical through bores includes a coaxial counterbore portion, extending inwardly from said top faces, for fully receiving a head portion of said first attachment member.

7. The assembly of claim 2, wherein said mounting plate includes multiple interior channels for conducting temperature-control fluid therethrough.

8. The assembly of claim 2, wherein said mounting plate includes multiple interior channels, each channel having an electric heating element mounted therein.

9. The assembly of claim 2, wherein each of said end blocks and said substrate block further includes a plurality of spaced second vertical through bores extending from said top faces to said bottom faces.

10. The assembly of claim 9, wherein said fluid component includes a plurality of spaced third vertical through bores, aligned with said plurality of spaced second vertical through bores of said substrate block: and a plurality of second attachment members, extending through said third plurality of vertical through bores, into said plurality of spaced second through bores of said substrate block for fixedly attaching said fluid control component to said substrate block.

11. The assembly of claim 10, wherein each of said end blocks further includes a mounting foot, said mounting foot depending from the bottom surface of said end block and being attached thereto via a plurality of fastening members extending through said plurality of spaced second vertical through bores of said end blocks into said mounting foot.

12. The assembly of claim 2, wherein said end block first and second bore portions and said substrate block first and second conduits serve in one of an inlet and outlet fluid flow capacity, depending upon the direction of movement of a fluid medium flowing through said assembly.

13. The assembly of claim 2, wherein said first and second bores of said at least two end blocks are equally spaced from, as well as parallel to, said top and bottom surfaces of said end blocks.

14. The assembly of claim 13, wherein at least one of said first and second bores of said at least two end blocks is unequally spaced from said end block top and bottom surfaces.

15. The assembly of claim 13, wherein said second bore is at an angle relative to said first bore.

16. The assembly of claim 2, wherein a second bore of one of said end blocks terminates at said top face.

17. The assembly of claim 2, wherein said industrial specification is ANSI/ISA Specification SP 76.00.02, 2002.

18. The assembly of claim 1, wherein each of said pluralities of first vertical through bores includes a coaxial counterbore portion, extending inwardly from said top faces, for fully receiving a head portion of said first attachment member.

19. The assembly of claim 1, wherein each of said at least two substrate blocks is provided with a plurality of first and second conduits, each conduit terminating at a different one of said substrate block lateral side and longitudinal end faces; with said pluralities of first and second conduits being located in a common plane, each of said pluralities of first and second conduits being in fluid communication via said third and fourth conduits, respectively, with at least one port of a plurality of said first and second ports within said fluid control component affixed to each of said substrate blocks.

20. The assembly of claim 19, wherein said pluralities of first and second conduits serve in one of an inlet and outlet fluid flow capacity, depending upon the direction of movement of a fluid medium flowing through said assembly, with at least one of said pluralities of first and second conduits serving an inlet fluid flow function and at least another of said pluralities of first and second conduits serving an outlet fluid flow function.

21. The assembly of claim 19, wherein said pluralities of first and second conduits in said at least one substrate block are equally spaced from, as well as parallel to, said top and bottom faces of said substrate blocks.

22. The assembly of claim 21, wherein said pluralities of first and second conduits are unequally spaced from said substrate block top and bottom surfaces.

23. The assembly of claim 1, wherein each of the outer ends of said third and fourth conduits, terminating in said substrate block top face, is provided with a coaxial counterbore portion; and a sealing member located in said counterbore for sealingly interconnecting with an adjoining surface of said fluid control component affixed on said top surface.

24. A modular component connector substrate system assembly for mounting thereon a fluidic control component of a fluid flow system, said assembly comprising:
   a. a pair spaced end blocks, each block including a body having spaced, parallel, top face and bottom faces, spaced, parallel, lateral side faces and spaced, parallel, longitudinal end faces, each end block having a first bore portion, substantially parallel with said top and bottom faces, terminating at one end in a first one of said lateral side and longitudinal end faces; each end block also having a second bore portion fluidically interconnected at one end with said first bore portion and at a second end with another one of said remaining side and end faces;
   b. a substrate block interposed between said end blocks, said substrate block including a body having spaced, parallel, top and bottom faces, spaced, parallel, lateral side faces and spaced, parallel longitudinal end faces; said substrate block having first and second conduits, substantially parallel with said top and bottom faces, each conduit terminating at one end in a different one of said substrate block lateral side and longitudinal end faces; said substrate block further having is spaced third and fourth conduits, substantially parallel to said side and end faces, with an outer end of each of said third and fourth conduits terminating in said top face and another end of each of said third and fourth conduits merging into another one of said first and second conduits, respectively; and said substrate block and end block top and bottom surfaces residing in the same parallel planes, with the one end of each end block first bore portions and the one of each of said substrate block third and fourth conduits including a recess portion of a predetermined size, depth and shape, each of said end blocks and said substrate block further including a plurality of spaced first vertical through bores extending from said top faces to said bottom faces;
   c. a fluid control component affixed to the top face of said at least one substrate block, said fluid control component having spaced first and second ports therein, said first and second ports being in fluid communication with said third and fourth conduits, respectively, of said substrate block;
   d. a mounting plate having a top surface thereof abutting the bottom faces of said substrate and end blocks, said mounting plate including a plurality of spaced first apertures, aligned with said plurality of spaced first vertical through bores of said substrate and end blocks: and a plurality of first attachment members extending through said first vertical through bores and said first apertures for fixedly joining said substrate and end blocks to said mounting plate, said mounting plate also serving to align adjoining ones of said substrate and end blocks so as to conform same to a predetermined centerline distance set forth in a known industrial specification; and
   e. a separate rigid fluid pressure connector fluidically and sealingly interconnecting as well as elastically coupling said substrate block with each of said end blocks at adjacent ones of the side and end faces of said substrate block and said end blocks; said pressure connector taking the form of a predetermined size, shape and longitudinal extent, with opposite halves thereof being adapted to be sealingly received within adjoining ones of said recess portions.

25. The assembly of claim 24, wherein both said recess portions and said pressure connector are substantially cylindrical in shape, with the longitudinal extent of said pressure connector being at least twice the longitudinal extent of one of said recess portions.

26. The assembly of claim 25, wherein said pressure connector is comprised of two mirror-image substantially cylindrical halves, each half including a central peripheral land portion and a spaced peripheral edge land portion, separated by a recessed peripheral groove; and a resilient O-ring positioned within said groove for sealingly interacting with a peripheral surface of a surrounding recess portion, with the resiliency of said O-ring also permitting said elastic coupling between said pressure connector and said adjoining recess portions.

27. The assembly of claim 24, wherein said mounting plate includes multiple interior channels for conducting temperature controlling fluid therethrough.

28. The assembly of claim 24, wherein each of said end blocks and said substrate block further includes a plurality of spaced second vertical through bores extending from said top faces to said bottom faces.

29. The assembly of claim 28, wherein said fluid component includes a plurality of spaced third vertical through bores, aligned with said plurality of spaced second vertical through bores of said substrate block; and a plurality of second attachment members, extending through said third plurality of vertical through bores, into said plurality of spaced second through bores of said substrate block for fixedly attaching said fluid control component to said substrate block.

30. The assembly of claim 29, wherein each of said end blocks further includes a mounting foot, said mounting foot depending from the bottom surface of said end block and being attached thereto via a plurality of fastening members extending through said plurality of spaced second vertical through bores of said end blocks into said mounting foot.

31. The assembly of claim 24, wherein said end block first and second bore portions and said substrate block first and second conduits serve in one of an inlet and outlet fluid flow capacity, depending upon the direction of movement of a fluid medium flowing through said assembly.

32. The assembly of claim 24, wherein said substrate block is provided with a plurality of at least one of said first and second conduits, each conduit terminating at a different one of said substrate block lateral side and longitudinal end faces; with said pluralities of at least one of said first and second conduits being located in a common plane and thus being capable of extending in any of the compass directions within said common plane; each of said pluralities of first and second conduits being in fluid communication, via said third and fourth conduits, respectively, with at least one port of a plurality of said first and second ports within said fluid component affixed to said substrate block.

33. The assembly of claim 32, wherein said pluralities of first and second conduits serve in one of an inlet and outlet fluid flow capacity, depending upon the direction of movement of a fluid medium flowing through said assembly, with at least one of said pluralities of first and second conduits serving an inlet fluid flow function and at least another of said pluralities of first and second conduits serving an outlet fluid flow function.

34. The assembly of claim 24, wherein said pluralities of first and second conduits in said substrate block are equally spaced from, as well as parallel to, said top and bottom faces of said substrate blocks.

35. The assembly of claim 34, wherein said pluralities of first and second conduits are unequally spaced from said substrate block top and bottom surfaces.

36. The assembly of claim 24, wherein said first and second bores of said end blocks are equally spaced from, as well as parallel to, said top and bottom surfaces of said end blocks.

37. The assembly of claim 24, wherein at least one of said first and second bores of said end blocks is unequally spaced from said end block top and bottom surfaces.

38. The assembly of claim 37, wherein said second bore is at an angle relative to said first bore.

39. The assembly of claim 24, wherein each of the outer ends of said third and fourth conduits, terminating in said substrate block top face, is provided with a coaxial counterbore portion; and a sealing member located in said counterbore for sealingly interconnecting each of said conduits with an adjoining surface of said fluid component affixed on said top surface.

40. The assembly of claim 24, wherein said industrial specification is ANSI/ISA Specification SP 76.00.02, 2002.

* * * * *